United States Patent [19]

Wilcox

[11] Patent Number: 4,750,144
[45] Date of Patent: Jun. 7, 1988

[54] REAL TIME PIPELINED SYSTEM FOR FORMING THE SUM OF PRODUCTS IN THE PROCESSING OF VIDEO DATA

[75] Inventor: Brian Wilcox, Tujunga, Calif.

[73] Assignee: The United States of America as represented by the Administrator of the National Aeronautics and Space Administration, Washington, D.C.

[21] Appl. No.: 815,106

[22] Filed: Dec. 31, 1985

[51] Int. Cl.$^4$ .................................. G06F 15/34
[52] U.S. Cl. .................................. 364/728; 364/757; 382/42
[58] Field of Search ............... 364/728, 736, 754, 757, 364/758, 604; 382/42, 41, 23, 34; 358/166

[56] References Cited

U.S. PATENT DOCUMENTS

| | | | |
|---|---|---|---|
| 3,725,689 | 4/1972 | Kautz | 364/728 |
| 3,866,030 | 11/1975 | Baugh et al. | 364/757 |
| 3,956,622 | 5/1976 | Lyon | 364/757 |
| 3,993,890 | 11/1976 | Peled et al. | 364/724 |
| 4,013,879 | 3/1977 | Bornmann et al. | 364/757 |
| 4,121,296 | 10/1978 | Snijders et al. | 364/724 |
| 4,145,931 | 3/1979 | Delforge | 364/724 |
| 4,161,033 | 7/1979 | Martinson | 364/728 |
| 4,231,100 | 10/1980 | Eggermont | 364/724 |
| 4,255,794 | 3/1981 | Nakayama | 364/724 |
| 4,293,922 | 10/1981 | Davio et al. | 364/757 |
| 4,322,810 | 3/1982 | Nakayama | 364/724 |
| 4,328,426 | 5/1982 | D'Ortenzio | 382/34 X |
| 4,334,277 | 6/1982 | Bond et al. | 364/758 X |
| 4,347,580 | 8/1982 | Bond | 364/728 X |
| 4,388,693 | 6/1983 | Nakayama | 364/724 |
| 4,407,013 | 9/1983 | Kanemasa | 364/736 |
| 4,430,721 | 2/1984 | Acampora | 364/724 |
| 4,432,066 | 2/1984 | Benschop | 364/758 |
| 4,450,533 | 5/1984 | Petit et al. | 364/724 |
| 4,489,393 | 12/1984 | Kawahara et al. | 364/728 |
| 4,574,357 | 3/1986 | Pastor et al. | 382/42 X |
| 4,623,923 | 11/1986 | Orbach | 382/42 X |
| 4,665,556 | 5/1987 | Fukushima et al. | 382/41 |

OTHER PUBLICATIONS

R. Bakis, et al., Pipelined Convolver for Two-Dimensional Images, IBM Technical Disclosure Bulletin, vol. 14, No. 2, Jul. 1971, pp. 475–476.

*Primary Examiner*—Gary V. Harkcom
*Assistant Examiner*—Tan V. Mai
*Attorney, Agent, or Firm*—Paul F. McCaul; John R. Manning; Thomas H. Jones

[57] ABSTRACT

A 3-by-3 convolver utilizes 9 binary arithmetic units (10) connected in cascade for multiplying 12-bit binary pixel values $p_i$ which are positive or two's complement binary numbers by 5-bit magnitude (plus sign) weights $w_i$ which may be positive or negative. The weights are stored in registers (13, 14 and 15) including the sign bits (shown separately for convenience). For a negative weight, the one's complement of the pixel value to be multiplied is formed at each unit by a bank of exclusive OR gates under control of the sign of the corresponding weight $w_i$, and a correction is made by adding the sum of the absolute values of all the negative weights for each 3×3 kernel. Since this correction value remains constant as long as the weights are constant, it can be precomputed and stored in a register (16) as a value to be added to the product PW of the first arithmetic unit.

10 Claims, 2 Drawing Sheets

REGISTERS

| | | |
|---|---|---|
| Multiplicand $p_i$ | 1 0 1 0 | Input |
| Multiplier $W_i$ | 1 1 0 1 | Input |
| $S = \Sigma \|W_i\|$ or PW+S | 0 0 0 1 0 0 1 1 0 | Input |

STEPS

| | | |
|---|---|---|
| 1. Enter S | 0 0 0 1 0 0 1 1 0<br>1 0 1 0 | Accumulator |
| 2. Add $p_i$<br>   Shift $p_i$ | 0 0 0 1 1 0 0 0 0<br>1 0 1 0 | Accumulator |
| 3. Add Zero<br>   Shift $p_i$ | 0 0 0 1 1 0 0 0 0<br>1 0 1 0 | |
| 4. Add $p_i$<br>   Shift $p_i$ | 0 0 1 0 1 1 0 0 0<br>1 0 1 0 | |
| 5. Add $p_i$ | 0 1 0 1 0 1 0 0 0 | Final Product<br>PW+S Output |

FIG. 2

REAL TIME PIPELINED SYSTEM FOR FORMING THE SUM OF PRODUCTS IN THE PROCESSING OF VIDEO DATA

ORIGIN OF INVENTION

The invention described herein was made in the performance of work under a NASA contract, and is subject to the provisions of Public Law 96-517 (35 USC 202) in which the Contractor has elected not to retain title.

BACKGROUND OF THE INVENTION

This invention relates to a convolver, namely a system comprising an arithmetic unit for carrying out the operation defined by the following equation:

$$\sum_{i}^{k} p_i w_i = \sum_{w_i>0} p_i|w_i| + \sum_{w_i<0} \bar{p}_i|w_i| + \sum_{w_i<0} |w_i|$$

This equation is explained and illustrated for the case of $k=9$, i.e., for a 3-by-3 moving window (kernel) of video data and more specifically to a real time pipelined convolver for forming the sum of products $p_i w_i$, wherein i is a number from 1 to $n^2$ and n is a number that defines the size of an n-by-n kernel, $p_i$ are the pixel values, typically 12-bit values of an n-by-n kernel, $w_i$ are the convolver weights that may have positive ($w_i>0$) and negative ($w_i<0$) values. The pixel values and weights are represented by absolute value binary numbers and a sign bit.

In the processing of video data, it is necessary to produce the sum of products of fixed weights $w_i$ times the corresponding pixel values $p_i$ of successive rows in an n-by-n kernel, such as a 3-by-3 kernel. Examination of the typical weights involved in low-level vision applications indicates that small positive or negative integers are most common, with the ratio of the smallest to the largest weight being usually less than 20. Consequently, each weight contains six bits consisting of a sign bit and five bits for magnitude from zero to 31. The sign bit expands the range of weight values from $-31$ to $+31$.

To prevent the data path from overflowing, it is necessary to scale the output of the convolver. Scaling is accomplished by shifting down the data one or more bits, i.e., dividing by some power of two. This is most easily done by switches selecting the parallel output, i.e., by selecting the output from one or more bit positions to the right. The problem is in the requisite hardware for multiplying the pixel values $p_i$ by positive and negative weights $w_i$ and forming the sum of the products.

SUMMARY OF THE INVENTION

In accordance with the present invention, a convolver is comprised of $N-1$ buffers for storing $N-1$ rasters (scan lines) of pixel values for an n-by-n kernel. The necessary multiplications and additions are carried out in arithmetic operating units connected in cascade in accordance with the following equation:

$$\sum_{i}^{k} p_i w_i = \sum_{w_i>0} p_i|w_i| + \sum_{w_i<0} \bar{p}_i|w_i| + \sum_{w_i<0} |w_i|$$

where $k = n \times n$, $p_i$ are the pixel values, $w_i$ are the convolver weights, and $\bar{p}_i$ are the one's complement of pixel values which are either unsigned or two's complement binary numbers, and weights are represented by absolute value binary numbers plus sign bits.

The number $N-1$ of complete scan lines that must be stored in order to cover successive n-by-n kernels, are stored in $N-1$ series connected buffers, each buffer storing a number n of pixels where n is the total number of pixels in a scan line. The accumulation of successive products $p_i w_i$ is accomplished by an array of m one-bit full adders using the absolute values of the convolver weights, both positive and negative, and the one's complement of the pixel value $p_i$ when it is to be multiplied by a negative convolver weight $w_i$. The accumulated sum of $p_i|w_i|$ and $\bar{p}_i|w_i|$ are corrected for the negative convolver weights by adding to the sum of products $p_i|w_i| + \bar{p}_i|w_i|$ the sum of $|w_i|$ for all convolver weights less than zero, i.e., for negative convolver weights.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2 illustrates an example of th algorithm for forming the sum of products PW+S in the system of FIG. 1.

DESCRIPTION OF PREFERRED EMBODIMENTS

Figure 1:
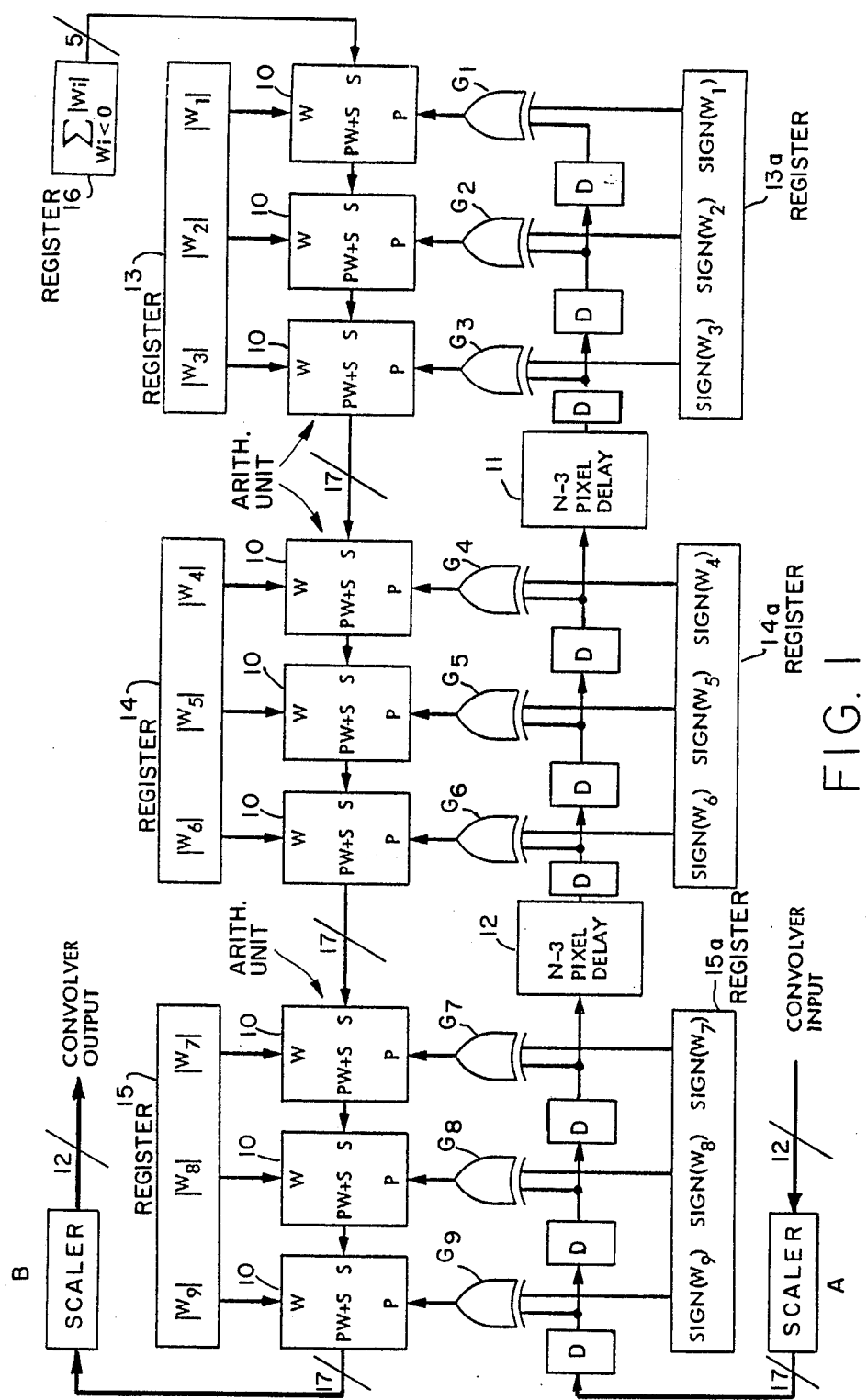
FIG. 1 is a schematic diagram of the present invention.

Referring to the drawings, FIG. 1 is a schematic diagram of a 3-by-3 convolver which produces the sum of products of nine fixed weights $w_1$ through $w_9$ times the corresponding pixel values $p_1$ through $p_9$ in a 3-by-3 moving window of video data. Examination of the typical weights used in low-level vision algorithms indicates that small positive or negative integers are most commonly used, with the ratio of the smallest to the largets weight being usually less than 20. This means that a six-bit (including sign) weight is adequate, since this can repesent integer values from $-31$ to $+31$.

To prevent the 12-bit data path from overflowing (because multiplying a 12-bit pixel by a 5-bit weight produces a result PW+S having 17 significant bits), it is also necessary to scale the output of the convolver in some variable way (since all large positive weights will produce a much larger result than a mix of small positive and negative weights). Scaling is most easily accomplished in hardware by shifting the data one or more bits, i.e., dividing by some power of two. If scaling were not included, adding nine of these 17-bit quantities PW+S together can produce a result having as 21 significant bits. Since only 12 of these bits can be output to maintain a constant data path throughout the pipeline, it would be excessive to compute the result accurately to 21 bits. However, somewhat more than 12 bits must be retained in intermediate stages of the convolver, since it is common to take derivatives of heavily smoothed data, which involves subtracting quantities which are nearly equal. To preserve 12 significant bits of result when subtracting quantities differing only by 10%, or so, requires a 16-bit internal data path. To ensure validity of the least significant bit of the output, an additional bit of low significance is also needed internally to the convolver. Thus, the convolver is provided with a 17-bit parallel data path between pipelined blocks for the results PW+S.

Scaling of the 17-bit result is accomplished in two stages: the input pixel values to the convolver may be shifted down in significance, allowing mor room for carry overflow when large positive weights are used, and the 12-bit output actually taken from the 17-bit convolver data output may be shifted up to allow for cancellation when subtracting nearly equal quantities. As discussed above, adding the products of nine 12-by-5 multiplications can produce a 21-bit result. However, having all nine weights near the maximum value of 31 is very unlikely, since they could all be divided by two and the result scaled to produce nearly identical results. Thus, it is reasonable to assume that the sum of the nine weights can always be kept to somewhat under the maximum 279 (9-by-31). If the sum of the weights is kept under 256 (9% less than 279), overflow into the 21st bit can be avoided. This means that shifting the input pixel values down in significance by up to three bits permits the 17-bit data path to accommodate the most significant bits of the 20-bit result. As a consequence, using the convolver of FIG. 1 calls for a programmable shift of from zero to three bits in the input data using external data input select switches as a scaler A. The shift of the output 12-bit data path with respect to the internal 17-bit data path is similarly programmable from zero to three using a scaler B, so that when subtracting nearly equal quantities more significant bits are preserved.

The arithmetic units blocks 10, are preferably implemented with custom VLSI circuit chips. The two complete scan lines that must be stored in order to cover the 3-by-3 window are stored in conventional line buffers (memory chips) comprised of N−3 pixel delays 11 and 12, each with three pixel delay elements in cascade for a total of N pixel delays, and three pixel delay elements which precede the N−3 pixel delay 11 to store the pixels $p_1$ through $p_9$ in a moving window array as follows:

$p_3$; $p_2$; $p_1$
$p_6$; $p_5$; $p_4$
$p_9$; $p_8$; $p_7$

It is highly desirable to utilize VLSI technology for implementation of the convolver (except for the line buffers), including registers 13, 14 and 15 for the three sets of weights $w_1$-$w_3$, $w_4$-$w_6$ and $w_7$-$w_9$. Note that the weights are represented by five bits of absolute value (magnitude) plus a sign bit. The sign bits are stored in registers 13a, 14a and 15a which are in reality part of registers 13, 14 and 15, but shown here separate because they are so separated by the convolver algorithm. Custom VLSI implementation allows the 12-by-5 bit arithmetic units 10 to be implemented directly within an internal 17-bit data path. Moreover, a custom VLSI circuit is easiest to design when the circuit to be implemented is a regular, repeated structure, as in this case of pipelined arithmetic units 10.

Accumulation of successive multiplications can be accomplished most straight forwardly by a multiplication algorithm of repeated add and shift operations, as illustrated in FIG. 2 using a simple example of a four-bit pixel as the multiplicand 1010 and a four-bit weight as the multiplier 1101. A nine-bit quantity S equal to 000100110, the sum of absolute values for all negative weights ($w_i < 0$) or the result PW+S from the previous arithmetic unit, is assumed as an input to an arithmetic unit 10. The incoming S is entered in the accumulator of the arithmetic unit as a first step. Then the least significant bit of the multiplier is inspected. Because it is a bit 1, the next step is to add the multiplicand in the four least significant bit positions of the accumulator. In the third step, the next least significant bit of the multiplier is inspected. Because it is a bit 0, zero is effectively added by doing nothing except effectively shifting the multiplicand before going into step number 4. Then the third multiplier bit is inspected. Because it is a bit 1, the multiplicand is effectively shifted, and added to the content of the accumulator. The process is repeated in step 5 for the last bit of the multiplier which, upon inspection after a shift, causes the multiplicand to be added to the partial products in the accumulator. The final product PW+S appears in the accumulator after the last step.

This algorithm for the arithmetic units 10 can be implemented for a 17-bit pixel and 5-bit weight (absolute value) with a 17-by-5 array of one-bit full adder circuits. (Note that in the preferred implementation illustrated in the simple example with reference to FIG. 2, the multiplicand is shifted only in the sense of it being added in a position of one binary bit higher significance in each step using selecting gates to the inputs of the adder, rather than actually shifting the multiplier in the registers 13, 14 and 15.) Thus, nine 17-by-5 arrays, for a total of 765 full adders, are needed for the convolver. In the preferred embodiment, seventeen-bit latches are used at the output of each of the arithmetic units 10 to store the intermediate accumulated results PW+S. This allows each multiplication to take the full pixel scan time. Appropriate reduction in the line buffer delay N corrects for these delays. The multiplication steps needed for each pixel are synchronously performed during pixel scan time.

Signed arithmetic is accomplished by the simple expedient of complementing the pixel value via exclusive OR operators $G_1$ through $G_9$ (each consisting of a bank of 17 exclusive OR gates connected to a one pixel delay element D for a 3×3 array of data) prior to multiplications by a negative weight. Since the one's complement of the pixel value plus one would produce the negative of that value in two's complement representation, the product of a negative weight and the pixel value is equal to the product of the absolute value of the weight (five bits without a sign bit), and the complement of the pixel value plus one. This is accomplished in the system of FIG. 1 by adding the absolute values of all negative weights together at the outset (since they are fixed at the time of programming), and storing that sum $$\sum_{w_i < 0} |w_i|$$

in a register 16.

The convolver thus organized performs the function of the following equation:

$$\sum_{i}^{9} p_i w_i = \sum_{w_i > 0} p_i w_i + \sum_{w_i < 0} (-p_i)|w_i| \qquad (1)$$

Using two's complement arithmetic, (i.e., $-p_i = \bar{p}_i + 1$) this function becomes:

$$\sum_{i}^{9} p_i w_i = \sum_{w_i>0} p_i w_i + \sum_{w_i<0} (\bar{p}_i + 1)|w_i| \quad (2)$$

However, instead of forming $\bar{p}_i+1$, the distributive law is applied yielding the following equation:

$$\sum_{i}^{9} p_i w_i = \sum_{w_i>0} p_i w_i + \sum_{w_i<0} \bar{p}_i|w_i| + \sum_{w_i<0} |w_i| \quad (3)$$

where $p_i$ are the pixel values, $w_i$ are the convolver weights, and $\bar{p}_i$ are the one's complement of the pixel values. In this way a uniform VLSI architecture can handle both positive and negative convolver weights. Note that the input pixel data to the convolver may be positive or negative, and that the final output of the convolver may also be positive or negative. In a particular unit, all bits of a pixel value are complemented when it is to be multiplied by a negative weight expressed in the form of absolute binary value plus a sign bit. Consequently, the multiplicand will have all 1's left of the most significant bit to fill the 17-bit word for the scaled pixel weight (if it was initially positive, or was negative with a positive weight), and so the product PW will be negative for a negative weight, but the output PW+S may be positive or negative depending on the value of S and whether it is positive or negative. In that regard, it should be noted that the correction value $$S = \sum_{w_i<0} |w_i|$$

added initially is always a positive number because it is the sum of the absolute value of all negative weights (five bits absolute without the sign bit).

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A system utilizing n×n binary arithmetic units connected in cascade from multiplying binary pixel values $p_i$ by binary weights $w_i$, where the pixel values are either positive or two's complement and the weights are expressed by an absolute value binary number and sign bit, comprising
    means for storing an array of n-by-n pixel values of raster scanned video data in a moving window of n successive pixels from n successive rasters,
    means for coupling said array of n-by-n pixel values to said n×n binary arithmetic units for multiplication of positive binary pixel values by corresponding positive weights and multiplication of the one's complement of binary pixel values by corresponding negative weights, and
    means for adding to the total sum produced by said arithmetic units connected in cascade the sum of the absolute value of all negative weights.

2. A system comprised
of a number k of pipelined arithmetic operating units and N−1 buffers connected in series for storing values of two rasters of pixels, plus means for storing the values of n pixels in series ahead of said buffers, while convolving n-by-n kernels in succession, where k equals n times n, and where the pixel values are either positive or two's complement binary numbers and the weights are positive or negative numbers expressed as a binary number of magnitude and a sign bit, registers for storing k convolver weights, $w_1$ through $w_k$,
    means responsive to a sign bit of negative weights for forming the one's complement of the pixel values to be multiplied by negative weights, and
    means for forming the sum of products in each operating unit in accordance with the equation PW+S, where the product PW is formed by repeated shift and add of pixel value P under control of a weight value W, where S is a previous sum of products PW formed in accordance with the equation $$\sum_{i}^{k} p_i w_i = \sum_{w_i>0} p_i|w_i| + \sum_{w_i<0} \bar{p}_i|w_i| + \sum_{w_i<0} |w_i|$$

where $p_i$ are the pixel values and $\bar{p}_i$ are the one's complement of pixel values, and where S for the first arithmetic unit forming the sum of products PW+S is the term $$\sum_{w_i<0} |w_i|.$$

3. A system as defined in claim 2 comprising
    registers for storing the weights, including sign bits, and
    an additional register for storing the sum of the absolute value of all negative weights formed at the outset as said term $$\sum_{w_i<0} |w_i|$$

to be added to the convolver output as a correction for an error produced in multiplying pixel values by negative weights by addition of the one's complement of the negative weights.

4. A system as defined in claim 3 where n equals 3 for convolving 3 by 3 kernels.

5. A system for forming the sum of products in the processing of video data comprising
    nine binary arithmetic units connected in cascade for multiplying binary pixel values $p_i$ which are positive or two's complement binary numbers by weights $w_i$ which are positive or two's complement binary numbers,
    means for storing said weights, including the sign bits of said weights,
    means for forming the one's complement of a pixel value $p_i$ to be multiplied by a negative weight $w_i$ under control of the sign bit of the negative weight $w_i$, and
    means for adding as a correction the sum of the absolute values of all the negative weights for each 3×3 kernel.

6. A system as defined in claim 5 wherein said correction sum is precomputed, and
    including means for storing said precomputed correction sum as a value to be added to the product of the first arithmetic unit.

7. A system comprised of
    N−1 buffers for storing N−1 rasters of pxiel values for an n-by-n kernel,
    means for carrying out necessary multiplications and additions in arithmetic operating units connected in cascade in accordance with the following equation:

$$\sum_{i}^{k} p_i w_i = \sum_{w_i>0} p_i |w_i| + \sum_{w_i<0} \bar{p}_i |w_i| + \sum_{w_i<0} |w_i| \quad \quad 5$$

where $k = n \times n$, $p_i$ are the pixel values, $w_i$ are the system weights, and $\bar{p}_i$ are the one's complement of pixel values which are either unsigned or two's complement binary numbers, and weights are represented by absolute value binary numbers plus sign bits, means for storing the number $N-1$ of complete rasters that must be processed in order to cover successive n-by-n kernels consisting of $N-1$ series connected buffers, each buffer storing a number n of pixels where n is the total number of pixels in a raster, means for accumulating successive products $p_i w_i$ consisting of an array of m one-bit full adders using the absolute values of the system weights, both positive and negative, and the one's complement of the pixel value $p_i$ when it is to be multiplied by a negative weight $w_i$, and means for correcting the accumulated sums of $p_i|w_i|$ and $\bar{p}_i|w_i|$ for negative weights by adding to the sum of products $p_i|w_i| + \bar{p}_i|w_i|$ the sum of the absolute value $w_i$ for all negative weights.

8. A method for forming the sum of products in the processing of video data in a kernel of $n \times n$ pixels by multiplying binary pixel values $p_i$ by binary weights $w_i$, where the pixel values are either positive or two's complement and the weights are expressed by an absolute value binary number and sign bit, comprising the steps of storing the array of n-by-n pixel values of raster scanned video data in a moving window of n successive pixels from n successive rasters, multiplying positive binary pixel values by corresponding positive weights and multiplying the one's complement of binary pixel values by corresponding negative weights, forming the sum of products produced by said multiplying steps and adding to the sum of products the sum of the absolute value of all negative weights.

9. A method for forming the sum of products in the processing of video data in a kernel of $3 \times 3$ pixels by multiplying binary pixel values $p_i$ which are either positive or two's complement binary numbers by weights $w_i$ which are positive or two's complement, comprising the steps of storing said weights including the sign bits of said weights, forming the one's complement of a pixel value $p_i$ to be multiplied by a negative weight $w_i$, and adding as a correction the sum of the absolute values of all the negative weights for each $3 \times 3$ kernel.

10. A method for forming the sum of products in the processing of video data in a 3-by-3 kernel as defined in claim 9, wherein said correction sum is precomputed, and including the step of storing said precomputed correction sum as a value to be added to said sum of products.

* * * * *